(12) United States Patent
Discekici et al.

(10) Patent No.: US 12,441,889 B2
(45) Date of Patent: Oct. 14, 2025

(54) HYDROGEL THREE-DIMENSIONAL PRINTING WITH SELF-CROSSLINKING PARTICULATE BUILD MATERIAL

(71) Applicant: PERIDOT PRINT LLC, Palo Alto, CA (US)

(72) Inventors: Emre Hiro Discekici, San Diego, CA (US); Shannon Reuben Woodruff, San Diego, CA (US); Jacob Wright, San Diego, CA (US); Carolin Fleischmann, San Diego, CA (US); Graciela Emma Negri Jimenez, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 170 days.

(21) Appl. No.: 17/912,617

(22) PCT Filed: Apr. 10, 2020

(86) PCT No.: PCT/US2020/027603
§ 371 (c)(1),
(2) Date: Sep. 19, 2022

(87) PCT Pub. No.: WO2021/206726
PCT Pub. Date: Oct. 14, 2021

(65) Prior Publication Data
US 2023/0144669 A1    May 11, 2023

(51) Int. Cl.
*C08L 101/14* (2006.01)
*B29C 64/165* (2017.01)
(Continued)

(52) U.S. Cl.
CPC .......... *C08L 101/14* (2013.01); *B29C 64/165* (2017.08); *B33Y 10/00* (2014.12);
(Continued)

(58) Field of Classification Search
CPC .................................................. B29C 64/165
See application file for complete search history.

(56) References Cited

U.S. PATENT DOCUMENTS

| 2004/0138336 A1 | 7/2004 | Bredt et al. |
| 2005/0059757 A1 | 3/2005 | Bredt et al. |
| (Continued) | | |

FOREIGN PATENT DOCUMENTS

| CN | 106189011 A | 12/2016 |
| WO | 2004/113042 A2 | 12/2004 |
| (Continued) | | |

OTHER PUBLICATIONS

Huang, M., et al., "High performances of dual network PVA hydrogel modified by PVP using borax as the structure-forming accelerator", Design Monomers Polymers, vol. 20, Issue 1, Sep. 29, 2017, pp. 505-513.

*Primary Examiner* — John J DeRusso
(74) *Attorney, Agent, or Firm* — Dierker & Kavanaugh, P.C.

(57) ABSTRACT

This disclosure describes hydrogel three-dimensional printing kits, methods of three-dimensional printing hydrogels, and hydrogel three-dimensional printing systems. In one example, a hydrogel three-dimensional printing kit can include a particulate build material and an aqueous agent. The particulate build material can include from about 90 wt % to 100 wt % of a mixture of a powdered polyhydroxylated swellable polymer dry blended with powdered water-soluble crosslinker that is reactive with hydroxyl groups of the polyhydroxylated swellable polymer to crosslink the polyhydroxylated swellable polymer. The aqueous agent can include water and an organic co-solvent, and the aqueous agent may not include the crosslinker.

13 Claims, 4 Drawing Sheets

(51) Int. Cl.
*B29K 29/00* (2006.01)
*B29K 105/00* (2006.01)
*B29K 105/24* (2006.01)
*B33Y 10/00* (2015.01)
*B33Y 30/00* (2015.01)
*B33Y 70/00* (2020.01)

(52) U.S. Cl.
CPC ............... *B33Y 30/00* (2014.12); *B33Y 70/00* (2014.12); *B29K 2029/04* (2013.01); *B29K 2105/0061* (2013.01); *B29K 2105/24* (2013.01); *B29K 2995/0088* (2013.01)

(56) References Cited

U.S. PATENT DOCUMENTS

| 2005/0080191 A1* | 4/2005 | Kramer | B33Y 70/00 525/191 |
| 2005/0087902 A1* | 4/2005 | Farr | B29C 64/165 425/375 |
| 2006/0208388 A1* | 9/2006 | Bredt | B33Y 70/00 156/305 |

FOREIGN PATENT DOCUMENTS

| WO | 2016/090286 A1 | 6/2016 |
| WO | 2017/112682 A1 | 6/2017 |

\* cited by examiner

HYDROGEL THREE-DIMENSIONAL PRINTING WITH SELF-CROSSLINKING PARTICULATE BUILD MATERIAL

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. Unfortunately, the concept has been somewhat limited with respect to commercial production capabilities because the range of materials used in three-dimensional printing is likewise limited.

DETAILED DESCRIPTION

The present disclosure describes hydrogel three-dimensional printing kits, methods of three-dimensional printing hydrogels, and hydrogel three-dimensional printing systems. In one example, a hydrogel three-dimensional printing kit includes a particulate build material and an aqueous agent. The particulate build material includes from about 90 wt % to 100 wt % of a mixture of a powdered polyhydroxylated swellable polymer dry blended with powdered water-soluble crosslinker that is reactive with hydroxyl groups of the polyhydroxylated swellable polymer to crosslink the polyhydroxylated swellable polymer. The aqueous agent includes water and an organic co-solvent, wherein the aqueous agent does not include the crosslinker. In some examples, the polyhydroxylated swellable polymer can include polyvinyl alcohol, cellulose, gelatin, alginate, chitosan, hyaluronic acid, poly(2-hydroxyethyl acrylate), poly(2-hydroxyethyl methacrylate), poly(acrylic acid), poly(methacrylic acid), poly(N,N-dimethylacrylamide), poly(N,N-diethylacrylamide), poly(N-isopropylacrylamide), or a combination thereof. In certain examples, the polyhydroxylated swellable polymer can be polyvinyl alcohol having a weight average molecular weight from about 500 Mw to about 500,000 Mw. In other examples, the crosslinker can be reactive to form hydrogen bonds with the hydroxyl groups of the polyhydroxylated swellable polymer. In certain specific examples, the crosslinker can include sodium tetraborate, boric acid, citric acid, succinic acid, cationic calcium, cationic barium, or a combination thereof. In some examples, the crosslinker can be present in the particulate build material at a concentration from about 1 wt % to about 50 wt %. In further examples, the aqueous agent can consist of water, the organic co-solvent, and optionally a surfactant.

The present disclosure also describes methods of three-dimensional printing hydrogels. In one example, a method of three-dimensional printing a hydrogel includes iteratively applying individual layers of a particulate build material to a powder bed. The particulate build material includes from about 90 wt % to 100 wt % of a mixture of a powdered polyhydroxylated swellable polymer dry blended with powdered water-soluble crosslinker that is reactive with hydroxyl groups of the polyhydroxylated swellable polymer to crosslink the polyhydroxylated swellable polymer. An aqueous agent is iteratively and selectively applied, based on a three-dimensional object model, onto the individual layers. The aqueous agent includes water and an organic co-solvent, but the aqueous agent does not include the crosslinker. A three-dimensional printed hydrogel is thereby formed. In some examples, the particulate build material can be at a temperature from about 0° C. to about 75° C. during three-dimensional printing of the hydrogel. In further examples, the aqueous agent can be applied onto the individual layers at an agent density so that the individual layers include from about 50 wt % to about 95 wt % water based on a total weight of individual layer and aqueous agent applied. In certain examples, the polyhydroxylated swellable polymer can include polyvinyl alcohol, cellulose, gelatin, alginate, chitosan, hyaluronic acid, poly(2-hydroxyethyl acrylate), poly(2-hydroxyethyl methacrylate), poly(acrylic acid), poly(methacrylic acid), poly(N,N-dimethylacrylamide), poly(N,N-diethylacrylamide), poly(N-isopropylacrylamide), or a combination thereof. In other examples, the crosslinker can be present in the particulate build material in an amount from about 1 wt % to about 50 wt %, and the crosslinker can include sodium tetraborate, boric acid, citric acid, succinic acid, cationic calcium, cationic barium, or a combination thereof.

The present disclosure also describes hydrogel three-dimensional printing systems. In one example, a hydrogel three-dimensional printing system includes a particulate build material and a fluid applicator fluidly coupled or coupleable to an aqueous agent. The particulate build material can include from about 90 wt % to 100 wt % of a mixture of a powdered polyhydroxylated swellable polymer dry blended with powdered water-soluble crosslinker that is reactive with hydroxyl groups of the polyhydroxylated swellable polymer to crosslink the polyhydroxylated swellable polymer. The fluid applicator can be directable to iteratively apply the aqueous agent to layers of the particulate build material. The aqueous agent can include water and an organic co-solvent, and the aqueous agent may not include the crosslinker. In some examples, the polyhydroxylated swellable polymer can include polyvinyl alcohol, cellulose, gelatin, alginate, chitosan, hyaluronic acid, poly(2-hydroxyethyl acrylate), poly(2-hydroxyethyl methacrylate), poly(acrylic acid), poly(methacrylic acid), poly(N,N-dimethylacrylamide), poly(N,N-diethylacrylamide), poly(N-isopropylacrylamide), or a combination thereof. In further examples, the crosslinker can be present in the particulate build material in an amount from about 1 wt % to about 50 wt %, and the crosslinker can include sodium tetraborate, boric acid, citric acid, succinic acid, cationic calcium, cationic barium, or a combination thereof.

It is noted that when discussing the hydrogel three-dimensional printing kits, methods, and systems herein, these discussions can be considered applicable to one another whether or not they are explicitly discussed in the context of that example. Thus, for example, when discussing an aqueous agent related to a three-dimensional printing kit, such disclosure is also relevant to and directly supported in the context of methods and systems, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Hydrogel Three-Dimensional Printing Kits

The three-dimensional printing kits, methods, and systems described herein can be used to make three-dimensional printed hydrogels. Hydrogels are a material made up of a network of hydrophilic polymer chains permeated by a relatively large amount of water. The polymer network can maintain its structure while holding the water, thus forming a gel. In various examples, water can make up 10 wt % or more of the hydrogel. In some examples, hydrogels can include water in an amount from about 50 wt % to about 95 wt % or more. The high water content and flexible nature of the polymer network can allow the hydrogel to be flexible. The degree of flexibility of the hydrogel can depend on variables such as the water content of the hydrogel, the properties of the polymer, degree of crosslinking of the polymer, and others.

Hydrogels have many applications in the field of life sciences. Scaffolds for tissue engineering can be made from hydrogels. The high water content of the hydrogel can provide a suitable environment for living cells. In certain examples, the methods described herein can be performed at temperatures that can be suitable for living cells, such as near normal body temperature. Accordingly, these methods can be used for applications in which living cells may be present during the three-dimensional printing process. Hydrogels can also be used as a medium for cell culture. Additionally, hydrogels can be injectable or implantable and may be used to deliver drugs or help with tissue regeneration. Hydrogels can also be used for a variety of other applications related to life sciences or in other non-related fields.

The hydrogels formed using the three-dimensional printing kits, methods, and systems described herein can be crosslinked. In some examples, the hydrogels can be formed by three-dimensional printing using a particulate build material that includes both a swellable polymer and a crosslinker that can react with the swellable polymer to form crosslinks. However, the crosslinker can be unable to react with the polymer when in a dry state. Accordingly, the particulate build material can be a dry powder that includes polymer particles and dry particles of the crosslinker. An aqueous agent can be added to the particulate build material to swell the polymer and to allow the crosslinker to react with the polymer. In some examples, the crosslinker can be water soluble so that the crosslinker can dissolve in the aqueous agent and quickly react with the polymer to form crosslinks.

In some examples, the hydrogels can be formed using a layer-by-layer process in which individual layers of the particulate build material are spread on a powder bed, and then an aqueous agent can be applied to the powder bed to form a layer of crosslinked hydrogel. In certain examples, the aqueous agent can be applied using a fluid ejector similar to an inkjet printhead. The aqueous agent can be applied precisely with high resolution to certain areas of the powder bed. The particles of crosslinker that contact the aqueous agent can become dissolved in the aqueous agent and the polymer particles that contact the aqueous agent can become crosslinked together. At the same time, the polymer particles can absorb water from the aqueous agent. This can cause the crosslinked polymer to swell and become a hydrogel. Additional layers of dry particulate build material can be spread on the powder bed, and additional aqueous agent can be applied to form more crosslinked layers of hydrogel. The individual layers can have shapes corresponding to layers or slices of a three-dimensional object model. Multiple layers can be formed using this process, and the individual layers can be crosslinked together, forming a continuous hydrogel matrix. In this way, a hydrogel object can be formed having any desired three-dimensional shape. Once the three-dimensional hydrogel object is complete, the object can be removed from the powder bed. Any stray dry polymer particles on the surface of the object can be removed by scraping, pressurized air blasting, vacuuming, sandblasting, scrubbing, or another method.

Figure 1:
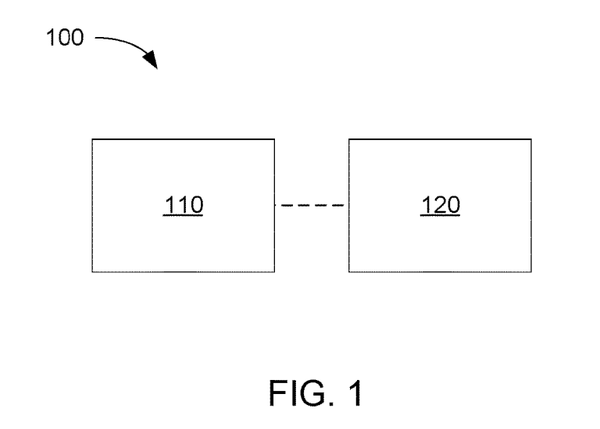
FIG. 1 is a schematic view of an example hydrogel three-dimensional printing kit in accordance with examples of the present disclosure.

With this description in mind, FIG. 1 shows a schematic view of an example hydrogel three-dimensional printing kit 100. The kit includes a particulate build material 110 and an aqueous agent 120. The particulate build material includes from about 90 wt % to 100 wt % of a mixture of a powdered polyhydroxylated swellable polymer dry blended with powdered water-soluble crosslinker that is reactive with hydroxyl groups of the polyhydroxylated swellable polymer to crosslink the polyhydroxylated swellable polymer. The aqueous agent includes water and an organic co-solvent, and the aqueous agent does not include the crosslinker.

In various examples, the polyhydroxylated swellable polymer can include a variety of polymers that are water absorbent and that include multiple hydroxyl groups. Specifically, "polyhydroxylated" can refer to polymers that include two or more hydroxyl groups per polymer chain. The hydroxyl groups can allow the crosslinker in the particulate build material to crosslink different polymer chains together. In various examples, the polymer can include any number of hydroxyl groups provided that there are two or more per chain. In certain examples, the polymer can have from 2 to 20,000 hydroxyl groups per polymer chain.

As used herein, "swellable" refers to polymers that can absorb water. Accordingly, the swellable polymers can be sufficiently hydrophilic that the dry polymer can absorb water. Additionally, swellable polymers can have or form a polymer network that can absorb and hold water without become entirely dissolved by the water. In some examples, such a polymer network can be formed by crosslinking individual polymer chains. In some examples, the polymer can begin as a water-soluble polymer and the polymer can be crosslinked by reacting with the crosslinker during three-dimensional printing. Accordingly, swellable polymers as described herein can be non-crosslinked and water-soluble at the beginning of the three-dimensional printing process. The polymer can become crosslinked when the aqueous agent is applied and the crosslinker reacts with the polymer. This can allow the crosslinked polymer to hold water without the crosslinked structure dissolving in the water. In other examples, the swellable polymer can have some degree of crosslinking to begin with. For example, the polymer can be lightly crosslinked or partially crosslinked. Then, when the aqueous agent is applied and the polymer reacts with the crosslinker in the particulate build material, additional crosslinking can form so that the individual polymer particles are crosslinked together to form a larger crosslinked structure. As mentioned above, one characteristic of hydrogels is the ability to absorb and hold water without the polymer structure being dissolved in the water.

Non-limiting examples of polyhydroxylated swellable polymers can include polyvinyl alcohol, cellulose, gelatin, alginate, chitosan, hyaluronic acid, poly(2-hydroxyethyl acrylate), poly(2-hydroxyethyl methacrylate), poly(acrylic acid), poly(methacrylic acid), poly(N,N-dimethylacrylamide), poly(N,N-diethylacrylamide), poly(N-isopropylacrylamide), and combinations thereof. In some examples, the particulate build material can include one of these polyhydroxylated swellable polymers or a combination of multiple such polymers. In other examples, the particulate build material can include a combination of polyhydroxylated swellable polymer and an additional polymer. For example, individual particles of the particulate build material can be a blend of polyhydroxylated swellable polymer and an additional polymer. In certain examples, the individual particles can include from about 90 wt % to 100 wt % polyhydroxylated swellable polymer.

The polyhydroxylated swellable polymer can have any suitable molecular weight, provided that the polymer includes polymer chains having multiple hydroxyl groups. In certain examples, the polyhydroxylated swellable polymer can have a weight average molecular weight from about 1,000 Mw to about 500,000 Mw. In other examples, the molecular weight can be from about 10,000 Mw to about 300,000 Mw or from about 20,000 Mw to about 200,000 Mw. In certain examples, the polyhydroxylated swellable polymer can be polyvinyl alcohol having a molecular weight from about 1,000 Mw to about 500,000 Mw, or from about 10,000 Mw to about 300,000 Mw, or from about 20,000 Mw to about 200,000 Mw.

The particulate build material can include polymer particles having a variety of shapes, such as substantially spherical particles or irregularly-shaped particles. In some examples, the polymer particles can be capable of being formed into three-dimensional printed objects with a resolution of about 20 μm to about 1000 μm, about 30 μm to about 800 μm, or about 40 μm to about 600 μm. As used herein, "resolution" refers to the size of the smallest feature that can be formed on a three-dimensional printed object. The particulate build material can form layers from about 20 μm to about 600 μm thick, allowing the fused layers of the printed part to have roughly the same thickness. In some examples, the layer thickness can also change when aqueous agent is applied to the particulate build material because the polymer of the particulate build material can absorb water and swell to an increased volume. In some examples, the overall resolution in the z-axis (i.e., depth) direction, based on the layer height of the dry polymer particles and/or the layer height when the polymer particles absorb water, can be about 20 μm to about 600 μm. The particulate build material can also have a sufficiently small particle size and sufficiently regular particle shape to provide about 20 μm to about 600 μm resolution along the x-axis and y-axis (i.e., the axes parallel to the top surface of the powder bed). For example, the particulate build material can have an average particle size (or mean particle size) from about 20 μm to about 600 μm. In other examples, the average particle size can be from about 20 μm to about 500 μm. Other resolutions along these axes can be from about 30 μm to about 400 μm or from 40 μm to about 300 μm. In further examples, the particulate build material can have a D50 particle size (or median particle size) from about 20 μm to about 600 μm, or from about 20 μm to about 500 μm, or from about 100 μm to about 300 μm. Additionally, the particulate build material can have a D90 particle size from about 100 μm to about 800 μm, or from about 200 μm to about 600 μm, or from about 300 μm to about 500 μm, in some examples. The "D50" particle size is defined as the diameter threshold (based on particle volume modified to a spherical shape to determine diameter) at which 50% of the particles have a diameter below the threshold. Similarly, D90 particle size is defined as the diameter threshold at which 90% of the particles have a diameter below the threshold, again adjusted to spherical shape based particle volume.

As explained above, the particulate build material can include a mixture of the polymer particles and a powdered crosslinker that is reactive with hydroxyl groups of the polymer to crosslink the polymer. In certain examples, the crosslinker can form hydrogen bonds with the hydroxyl groups of the polyhydroxylated swellable polymer. Thus, "reactive with" includes the capability of forming hydrogen bonds with the hydroxyl groups. In further examples, the crosslinker may react with the hydroxyl groups in other ways, such as by forming covalent bonds, ionic crosslinking, and so on. Additionally, the crosslinker may not react with the polyhydroxylated swellable polymer until the crosslinker is dissolved by an aqueous agent. In some examples, the crosslinker is a dry powder that does not react with the polymer powder, or reacts slightly with the polymer powder, when the particulate material is in a dry state.

A variety of crosslinker compounds can be suitable for crosslinking polyhydroxylated polymers. In certain examples, the crosslinker can be sodium tetraborate, boric acid, citric acid, succinic acid, cationic calcium, cationic barium, or a combination thereof. These examples can also include salt forms of the crosslinker compounds, such as halide salts of acid crosslinkers and cationic ionic crosslinkers. For example, sodium tetraborate can be an alternative compound for boric acid. Other salt forms of crosslinker compounds can also be used. Some crosslinker compounds can be water-soluble. These crosslinkers can be dissolved in water of the aqueous agent when the aqueous agent is applied to the particulate build material. In further examples, the aqueous agent can include a liquid vehicle that includes water and an organic solvent. In some such examples, the crosslinker compound can be soluble in the liquid vehicle of the aqueous agent.

As used herein, "water-soluble" refers to materials that can be dissolved in water at a concentration from about 5 wt % to about 99 wt % of the dissolved material with respect to the entire weight of the solution. The solution of a water-soluble material can be fully transparent without any phase separation. Materials that are not water-soluble can be referred to as "water-insoluble."

In some examples, the powdered crosslinker can by blended with the polymer particles in an amount from about 1 wt % to about 50 wt %, with respect to the total weight of the particulate build material. In further examples, the crosslinker can be included in an amount from about 1 wt % to about 25 wt % or from about 25 wt % to about 50 wt %. In still further examples, the crosslinker can be included in the particulate build material in an amount from about 10 wt % to about 40 wt % or from about 20 wt % to about 30 wt %. Using a greater amount of crosslinker can make the final three-dimensional printed hydrogel stiffer because the hydrogel can have a greater extent of crosslinking. Accordingly, the amount of crosslinker in the particulate build material can be adjusted to achieve a desired stiffness.

Figure 2:
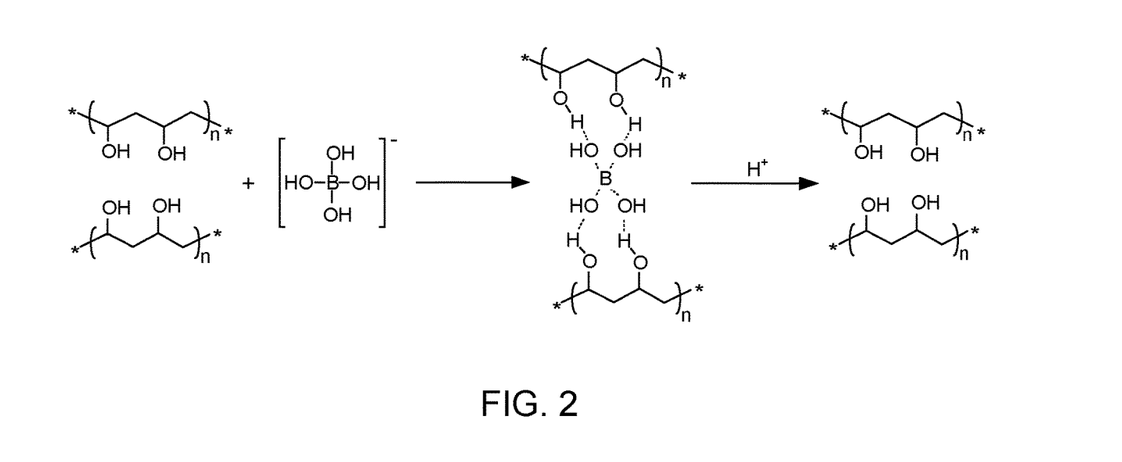
FIG. 2 is a schematic illustration of a crosslinking reaction of a borate ion with polyvinyl alcohol polymer chains in accordance with examples of the present disclosure.

In a particular example, the crosslinker can include boric acid or a borate salt, and the polyhydroxylated swellable polymer of the particulate build material can include polyvinyl alcohol. In a particular example, the crosslinker can be sodium tetraborate. When dissolved in the aqueous agent, the sodium tetraborate can form tetrahedral borate ions, which can crosslink polyvinyl alcohol by forming hydrogen bonds with hydroxyl groups of the polyvinyl alcohol. A mechanism for crosslinking polyvinyl alcohol using tetrahedral borate ions is shown in FIG. 2. The crosslinking can also be reversed, in some examples, by exposing the polymer to an acidic pH. This degradation process is also shown in FIG. 2.

As mentioned above, in some examples the particulate build material can be mostly made up of the mixture of polymer particles and crosslinker. For example, from about 90 wt % to 100 wt % of the particulate build material can be the mixture of polymer particles and crosslinker. Other ingredients can be included in the particulate build material in smaller amounts. In some examples, the particulate build material can include a filler. The filler can include inorganic particles such as alumina, silica, fibers, carbon nanotubes, or combinations thereof. When the swellable polymer particles become crosslinked together during three-dimensional printing, the filler particles can become embedded in the crosslinked polymer network, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In further examples, fillers can be added to modify physical properties of the polymer material. In some examples, a weight ratio of swellable polymer particles to filler particles can be from about 1,000:1 to about 45:10.

Turning now to the aqueous agent, in some examples the main ingredient of the aqueous agent can be water. Water can swell the swellable polyhydroxylated polymer and dissolve the crosslinker in the particulate build material. In some examples, the aqueous agent can be jetted onto the particulate build material using a fluid jetting device, such as inkjet printing architecture. Accordingly, in some examples, the aqueous agent can be formulated to give the aqueous agent good jetting performance. Ingredients that can be included in the aqueous agent to provide good jetting performance can include a liquid vehicle. Thermal jetting can function by heating the aqueous agent to form a vapor bubble that displaces fluid around the bubble, and thereby forces a droplet of fluid out of a jet nozzle. Thus, in some examples the water in the liquid vehicle can form vapor bubbles when heated.

In some examples, the aqueous agent can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. Other components can also be included such as biocides, viscosity modifiers, materials for pH adjustment, sequestering agents, preservatives, and the like. In one example, the aqueous agent can be predominantly water. For example, the aqueous agent can include from about 75 wt % to 100 wt % water, or from about 80 wt % to about 99 wt % water, or from about 80 wt % to about 95 wt % water.

Classes of co-solvents that can be used can include organic co-solvents including aliphatic alcohols, aromatic alcohols, diols, glycols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, propylene glycol, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidinone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the aqueous agent may range from about 0.01 wt % to about 20 wt %. Suitable surfactants can include, but are not limited to, liponic esters such as TERGITOL™ 15-S-12, TERGITOL™ 15-S-7 available from Dow Chemical Company (Michigan), LEG-1 and LEG-7; TRITON™ X-100; TRITON™ X-405 available from Dow Chemical Company (Michigan); and sodium dodecylsulfate.

Various other additives can be employed to enhance certain properties of the aqueous agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R. T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

In some examples, the aqueous agent can include a colorant if colored hydrogel is desired. Many of the polyhydroxylated swellable polymers suitable for hydrogel three-dimensional printing can be white or colorless. Accordingly, vivid colors can be obtained by using a colored aqueous agent during three-dimensional printing. Colorants can include dyes and/or pigments. In certain examples, the colorant can include water soluble dyes such as cyan, magenta, yellow, black, or other colored dyes. Combinations of these dyes can also be used. In alternative examples, the aqueous agent can be formulated without a colorant so that the aqueous agent is colorless. Such aqueous agents can be used to make colorless hydrogels. In further examples, the hydrogel three-dimensional printing kits can include additional fluid agents. For example, separate coloring agents can be used to color the three-dimensional printed hydrogel.

In many examples, the aqueous agent can be devoid of a polymeric binder or substantially devoid of a polymeric binder. Unlike two-dimensional printing inks, which often include a polymeric binder to bind colorants to a print substrate, the aqueous agents described herein can be designed for three-dimensional printing. In particular, the aqueous agents can be designed to apply to swellable polymer build material. Thus, the aqueous agents can function well in the three-dimensional printing process without any polymeric binder in the aqueous agent. In some cases, certain polymers may be present in the aqueous agent such as, for example, polymeric dispersants or polymers that perform other functions. However, in some examples the aqueous agent can be devoid of polymeric binder and any other polymers present in the agent can be present in minimal amounts, such as less than about 1 wt %, or less than about 0.5 wt %, or less than about 0.1 wt %.

In certain examples, the aqueous agent can include from about 50 wt % to about 99 wt % water, from about 1 wt % to about 50 wt % organic solvent, and from about 0.1 wt % to about 20 wt % surfactant. In further examples, the aqueous agent can include from about 2 wt % to about 20 wt % organic solvent, from about 0.1 wt % to about 0.9 wt % surfactant, and the remainder can be water. In a particular example, the aqueous agent can consist of water, an organic solvent, and optionally a surfactant.

Methods of Three-Dimensional Printing Hydrogels

Figure 3:
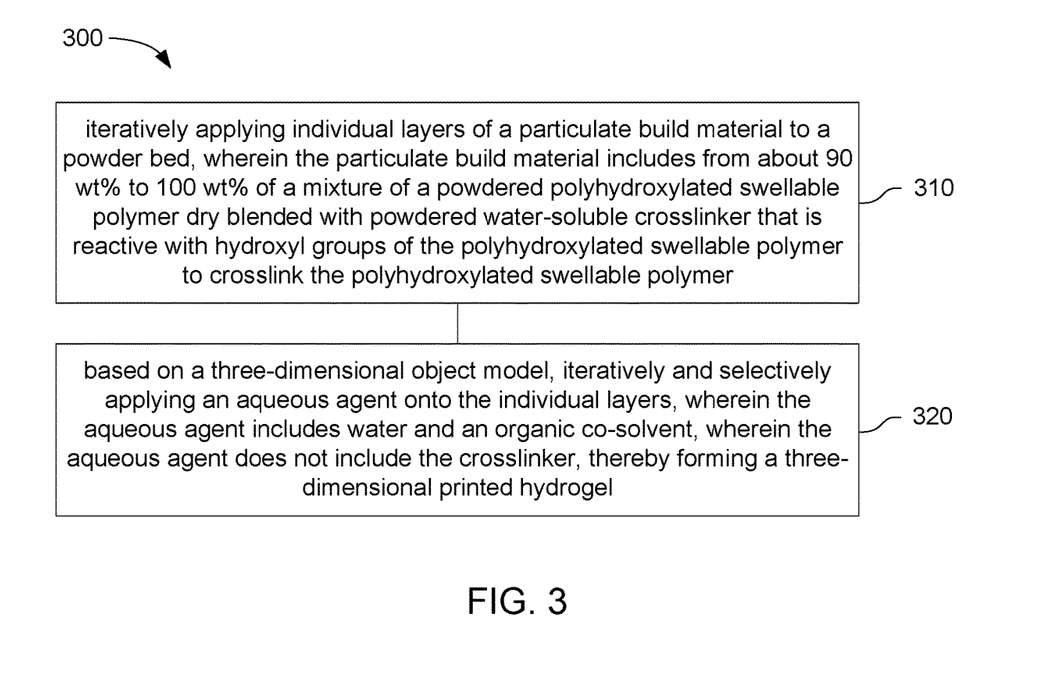
FIG. 3 is a flowchart of an example method of three-dimensional printing a hydrogel in accordance with examples of the present disclosure.

The present disclosure also describes methods of three-dimensional printing hydrogels. The materials described above in the hydrogel three-dimensional printing kits can be used in these methods. FIG. 3 shows a flowchart illustrating one example method 300 of three-dimensional printing a hydrogel. The method includes: iteratively applying individual layers of a particulate build material to a powder bed, wherein the particulate build material includes from about 90 wt % to 100 wt % of a mixture of a powdered polyhydroxylated swellable polymer dry blended with powdered water-soluble crosslinker that is reactive with hydroxyl groups of the polyhydroxylated swellable polymer to crosslink the polyhydroxylated swellable polymer 310; and based on a three-dimensional object model, iteratively and selectively applying an aqueous agent onto the individual layers, wherein the aqueous agent includes water and an organic co-solvent, wherein the aqueous agent does not include the crosslinker, thereby forming a three-dimensional printed hydrogel 320.

Figure 4A:
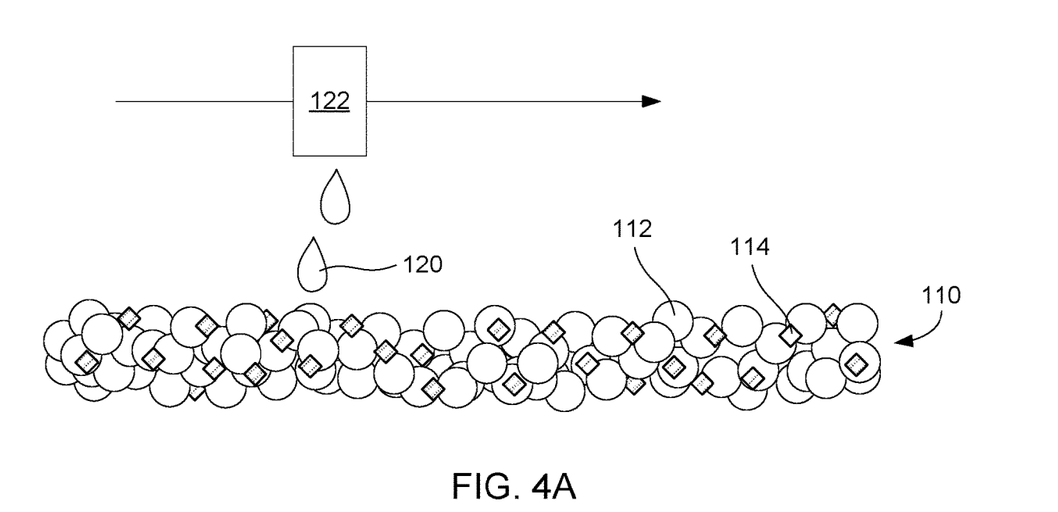
FIGS. 4A-4C show a schematic view of an example method of three-dimensional printing a hydrogel in accordance with examples of the present disclosure.
Figure 4B:
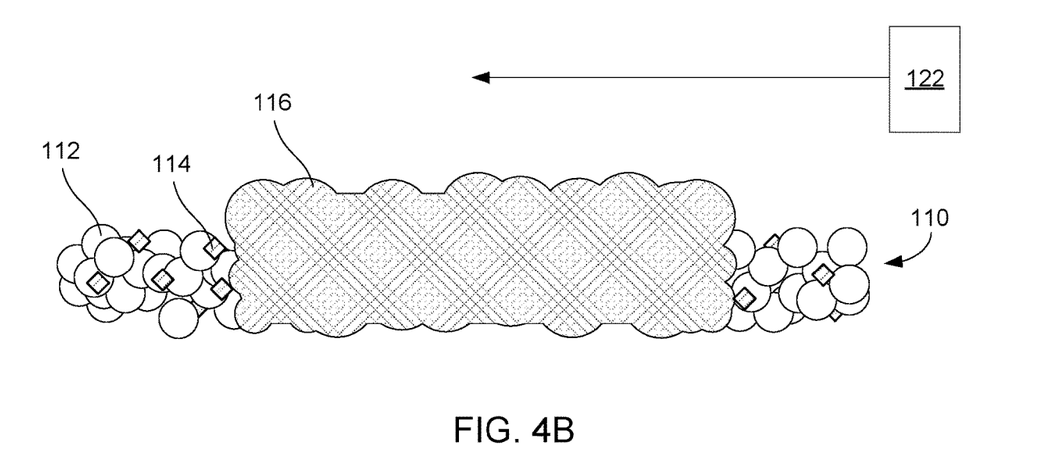
Figure 4C:
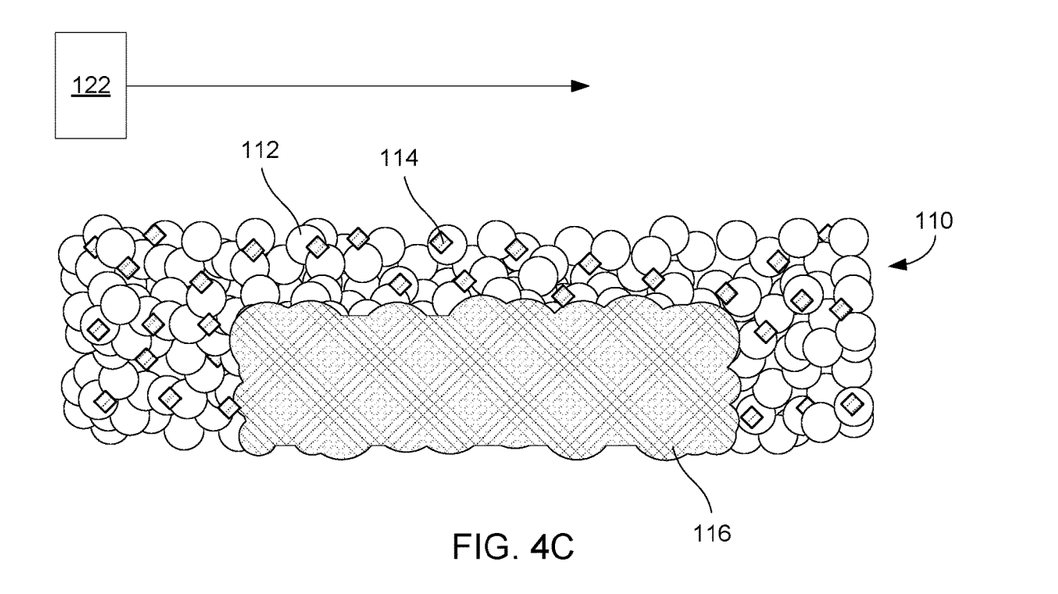

To further illustrate methods of three-dimensional printing hydrogels, FIGS. 4A-4C show one example method of three-dimensional printing a hydrogel using the hydrogel three-dimensional printing kits described above. In FIG. 4A, an aqueous agent 120 is jetted onto a layer of particulate build material 110 made up of particles of a polyhydroxylated swellable polymer 112 and particles of a powdered water-soluble crosslinker 114. The aqueous agent is jetted from an aqueous agent ejector 122. The aqueous agent ejector can move across the layer of particulate build material to selectively jet the aqueous agent on areas that are to be crosslinked to become part of the final hydrogel.

FIG. 4B shows the layer of particulate build material 110 after the aqueous agent has been jetted onto the powder bed. The aqueous agent has been jetted in an area of the particulate build material layer that is to be crosslinked to become part of the final three-dimensional printed hydrogel. The aqueous agent dissolves the crosslinker 114 so that crosslinker can react with the polymer particles 112 to form a crosslinked hydrogel 116. In this example, the polymer swells in the area where the aqueous agent was jetted due to the polymer absorbing water from the aqueous agent. As shown in the figure, this can result in a volume increase in the area where the aqueous agent was jetted, where the hydrogel has a larger volume than the original volume of the layer of particulate build material.

FIG. 4C shows an additional layer of particulate build material 110 spread over the top of the previous layer. The additional layer can have a sufficient layer thickness that some particulate build material covers the hydrogel formed in the previous layer. The process of jetting aqueous agent onto the powder bed can then be repeated to form an area of hydrogel from the additional layer of particulate build material. The individual layers of hydrogel can correspond to layers or slices of the three-dimensional object that is to be formed of hydrogel. The aqueous agent can cause the polymer in separate layers to react with the crosslinker and become crosslinked together so that the layers of hydrogel form a continuous crosslinked hydrogel network. This entire process can then be repeated for many more layers to build up a three-dimensional printed hydrogel object.

The aqueous agent can be applied to the particulate build material using a variety of methods. In some examples, the aqueous agent can be jetted onto the build material using a fluid jet print head. The amount of aqueous agent that is applied can be sufficient to dissolve the crosslinker in the particulate build material so that the crosslinker can react with the polyhydroxylated swellable polymer particles. The amount of aqueous agent applied can also be adjusted depending on the desired water content in the final three-dimensional printed hydrogel. When the aqueous agent is jetted onto the build material using a fluid ejector, the amount of aqueous agent applied can be controlled by ejecting a particular number of droplets of the aqueous agent onto a particular area of the powder bed. This can be referred to as the "agent density" or "contone level" of jetting the aqueous agent. In certain examples, the agent density or contone level can be controlled by selecting a number of droplets to print onto an area of the powder bed that is $1/600^{th}$ of an inch (42 µm) by $1/600^{th}$ of an inch (42 µm). The size of the droplets can be known in some examples. In certain examples, the droplet size can be from about 1 ng to 50 ng, or from about 5 ng to about 25 ng, or from about 6 ng to about 15 ng. In a particular example, the droplet size can be about 9 ng. The number of droplets printed onto the area of the powder bed can be from about 50 to about 100. The total amount of aqueous agent applied to an area of the powder bed can affect the water content in the three-dimensional printed hydrogel. In certain examples, the agent density can be selected so that the water content of the hydrogel is from about 50 wt % to about 95 wt % based on the total weight of the hydrogel. In further examples, the water content can be from about 70 wt % to about 95 wt % or from about 80 wt % to about 95 wt %.

In some examples, the temperature of the powder bed can be controlled during three-dimensional printing. However, in other examples, the three-dimensional printing can be performed at ambient temperature without temperature control. The aqueous agent can be applied to the particulate build material at or near room temperature to form the hydrogel. In certain examples, the particulate build material can be at a temperature from about 0° C. to about 75° C. during three-dimensional printing of the hydrogel. In further examples, the particulate build material can be at a temperature from about 20° C. to about 50° C. or from about 30° C. to about 40° C. In another example, the particulate build material can be at a temperature of about 37° C. The aqueous agent can also be maintained at a desired temperature so that the temperature of the particulate build material can be maintained during printing. In cases where the particulate build material is heated during three-dimensional printing, the heating can be accomplished with a heating lamp or lamps, an oven, a heated support bed, other types of heaters, or combinations thereof. In some examples, the entire powder bed can be heated to a substantially uniform temperature.

The three-dimensional printed hydrogel object can be formed to have a shape of a three-dimensional object model. Three-dimensional object models can in some examples be created using computer aided design (CAD) software. Three-dimensional object models can be stored in any suitable file format. In some examples, a three-dimensional printed hydrogel object as described herein can be based on a single three-dimensional object model. The aqueous agent can be applied to areas of the particulate build material that correspond to layers or slices of the three-dimensional object model. Other information may also be included in three-dimensional object models, such as structures to be formed of additional different materials or color data for printing the object with various colors at different locations on the object. The three-dimensional object model may also include features or materials specifically related to jetting fluids on layers of powder bed material, such as the desired amount of fluid to be applied to a given area. This information may be in the form of a contone level or droplet saturation, for example, which can instruct a three-dimensional printing system to jet a certain number of droplets of fluid into a specific area. This can allow the three-dimensional printing system to finely control the amount of fluid agent applied to the particulate build material. All this information can be contained in a single three-dimensional object file or a combination of multiple files. The three-dimensional printed hydrogel object can be made based on the three-dimensional object model. As used herein, "based on the three-dimensional object model" can refer to printing using a single three-dimensional object model file or a combination of multiple three-dimensional object models that together define the object. In certain examples, software can be used to convert a three-dimensional object model to instructions for a three-dimensional printer to form the object by building up individual layers of build material.

In an example of the three-dimensional printing process, a thin layer of particulate build material can be spread on a bed to form a powder bed. At the beginning of the process, the powder bed can be empty because no build material particles have been spread at that point. For the first layer, the particles can be spread onto an empty build platform. The build platform can be a flat surface made of a material such as a metal, glass, or plastic. Thus, "applying individual layers of a particulate build material to a powder bed" includes spreading particulate build material onto the empty build platform for the first layer. In other examples, a number of initial layers of particulate build material can be spread before the printing begins. These "blank" layers of particulate build material can in some examples number from about 1 to about 500, from about 10 to about 200, or from about 10 to about 100. In some cases, spreading multiple layers of powder bed before beginning the print can increase temperature uniformity of the three-dimensional printed hydrogel object. A fluid jet printing head, such as an inkjet print head, can then be used to print an aqueous agent over portions of the powder bed corresponding to a thin layer of the three-dimensional printed hydrogel object. The aqueous agent can dissolve the crosslinker in the particulate build material so that the polyhydroxylated swellable polymer becomes crosslinked. Water from the aqueous agent can also swell the polyhydroxylated swellable polymer. This can form the first layer of hydrogel. After the first layer is formed, a new thin layer of particulate build material can be spread over the powder bed and the process can be repeated to form additional layers until a complete three-dimensional hydrogel object is printed. Thus, "applying individual layers of a particulate build material to a powder bed" also includes spreading layers of particulate build material over the loose particles and crosslinked hydrogel layers beneath the new layer of particulate build material.

When the three-dimensional printed hydrogel object is complete, the object can be removed from the powder bed. In certain examples, any loose particulate build material that remains in the powder bed can be recycled and used for future three-dimensional printing. In some cases, particles of the particulate build material can cling to the surfaces of the three-dimensional printed hydrogel object. These particles can be loosely adhered to the object without being crosslinked. In some examples, the adhered particles can be removed from the hydrogel object by brushing, blowing with compressed air, sandblasting, vacuuming, or another method.

Hydrogel Three-Dimensional Printing Systems

The present disclosure also extends to hydrogel three-dimensional printing systems. The systems can include the particulate build material and aqueous agent described above. The systems can also include a fluid applicator to apply the aqueous agent to the particulate build material. In certain examples, the fluid applicator can be fluidly coupled or coupleable to an aqueous agent. The fluid applicator can also be directable to iteratively apply the aqueous agent to layers of the particulate build material. The aqueous agent can include water to swell the polyhydroxylated swellable polymer in the particulate build material and to dissolve the crosslinker in the particulate build material.

Figure 5:
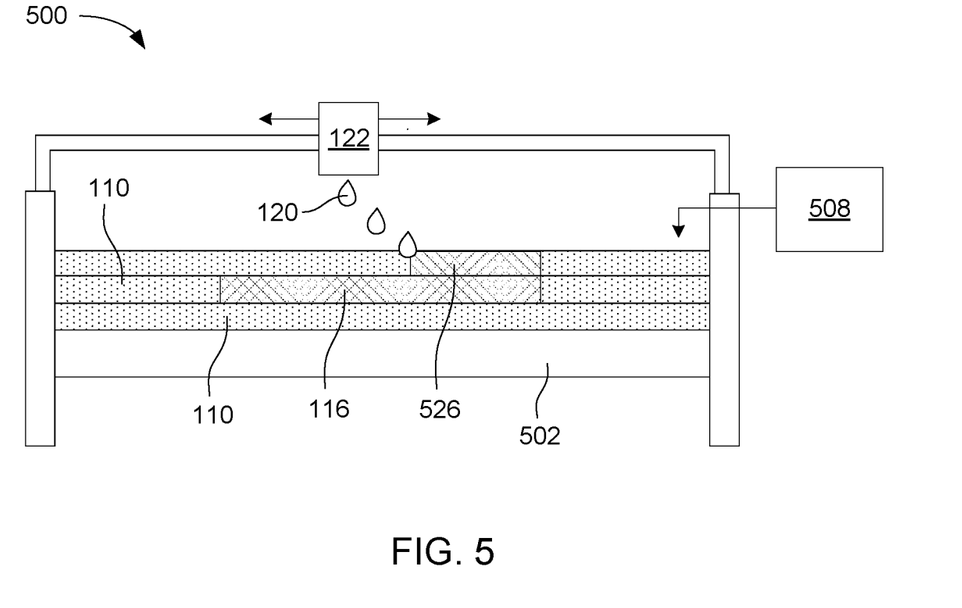
FIG. 5 is a schematic view of an example hydrogel three-dimensional printing system in accordance with examples of the present disclosure.

FIG. 5 shows an example hydrogel three-dimensional printing system 500 in accordance with the present disclosure. The system includes a build platform 502. Particulate build material 110 can be deposited onto the build platform by a build material applicator 508 where the particulate build material can be flattened or smoothed, such as by a mechanical roller or other flattening technique. This can form a flat layer of particulate build material. The aqueous agent 120 can then be applied to the layer by an aqueous agent ejector 122. The area 526 where the aqueous agent is applied can correspond to a layer or slice of a three-dimensional object model. FIG. 5 shows a first layer of hydrogel 116 that has already formed, with an additional layer of particulate build material spread over the top, and the system is in the process of applying the aqueous agent to the additional layer to form another layer of hydrogel.

As used herein, "applying individual layers of particulate build material to a powder bed" can include applying the first layer of particulate build material that is applied directly to an empty support bed. The "support bed" can refer to the build platform, as shown in FIG. 5, for example. Additionally, in some examples, a layer or multiple layers of particulate build material can be laid on the support bed without jetting any aqueous agent onto the layers. Accordingly, "applying individual layers of a particulate build material to a powder bed" can include applying a layer of particulate build material onto the initial layer or layers that may be applied without any aqueous agent. The phrase "applying individual layers of a particulate build material to a powder bed" also includes applying to subsequent layers, when a layer or slice of the three-dimensional printed hydrogel object has already been formed in the layer below.

In further examples, the system can include a temperature control device such as a heater and/or temperature sensors for feedback. As mentioned above, the three-dimensional printing processes described herein can be performed at relatively low temperatures, such as from about 0° C. to about 75° C. In certain examples, the three-dimensional printing process can be performed at or near body temperature or another temperature that can be suitable for living cells. In some examples, the system can include a heat lamp or other heater over the powder bed. In other examples, a heater or multiple heaters can be positioned on a side or sides of the powder bed, or a combination of these locations. In some examples, the support bed can include an additional integrated heater to heat the powder bed from below to maintain a more uniform temperature in the powder bed.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" can include pigment colorants, magnetic particles, aluminas, silicas, and/or other ceramics, organo-metallics or other opaque particles, whether or not such particulates impart color. Thus, though the present description mentions pigment colorants, the term "pigment" can be used to describe pigment colorants and also other pigments such as organometallics, ferrites, ceramics, etc. In one specific aspect, however, the pigment is a pigment colorant.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the MASTERSIZER™ 3000 available from Malvern Panalytical (United Kingdom). The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is that none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLE

The following illustrates an example of the present disclosure. However, it is to be understood that the following is merely illustrative of an example of the present disclosure. Numerous modifications and alternative devices, methods, and systems may be devised without departing from the present disclosure. The appended claims are intended to cover such modifications and arrangements.

Three-Dimensional Printing Evaluation

A sample particulate build material was prepared by mixing a water soluble polyvinyl alcohol powder with sodium tetraborate powder. The polyvinyl alcohol is a swellable polyhydroxylated polymer, and the sodium tetraborate is a crosslinker that can react with hydroxyl groups of the polyvinyl alcohol. The composition included 25 wt % sodium tetraborate powder and 75 wt % polyvinyl alcohol powder. The powders were dry blended using an acoustic mixer.

A sample aqueous agent was also prepared. The aqueous agent included an organic co-solvent in an amount between about 2 wt % and 20 wt %, a surfactant in an amount between about 0.1 wt % and 0.9 wt %, with the remainder being deionized water.

The sample aqueous agent and the sample particulate bed material were loaded in a test three-dimensional printer that included a build platform for supporting a powder bed of the build material and an inkjet printhead for jetting the aqueous agent onto the powder bed of build material. The layer height was set at 400 µm, meaning that when a fresh layer of particulate build material was spread on the powder bed, the upper surface of the layer was 400 µm higher than the previous layer. The amount of aqueous agent jetted onto the powder bed was between 50 and 100 droplets (having a weight of 9 ng per droplet) per square of $\frac{1}{600}^{th}$ inch by $\frac{1}{600}^{th}$ inch. This amount of aqueous agent corresponded to a layer of liquid having a depth of 200-400 μm deposited onto the individual layers of particulate build material.

Several dog-bone-shaped sample hydrogel objects were printed using the test three-dimensional printer using these settings. The temperature of the powder bed was maintained at less than 37° C. during printing. After printing the dog-bone shapes, multiple hydrogel objects were successfully removed from the powder bed. The hydrogel objects that were formed had a high stiffness due to the relatively large amount of crosslinker in the particulate build material. These results show that three-dimensional printed objects with good mechanical strength can be made using the particulate build materials and the aqueous agents described herein.

What is claimed is:

1. A three-dimensional printing kit, comprising:
    particulate build material comprising from about 90 wt % to 100 wt % of a mixture of a powdered polyhydroxylated swellable polymer dry blended with a powdered water-soluble crosslinker that is reactive with hydroxyl groups of the polyhydroxylated swellable polymer to crosslink the polyhydroxylated swellable polymer, wherein;
        the polyhydroxylated swellable polymer is selected from the group consisting of polyvinyl alcohol, gelatin, chitosan, hyaluronic acid, poly(2-hydroxyethyl acrylate), poly(2-hydroxyethyl methacrylate), poly(methacrylic acid), poly(N,N-dimethylacrylamide), poly(N,N-diethylacrylamide), poly(N-isopropylacrylamide), and a combination thereof;
        the water-soluble crosslinker is selected from the group consisting of sodium tetraborate, boric acid, cationic barium, and a combination thereof; and
        the water-soluble crosslinker is present in the particulate build material in an amount ranging from about 1 wt % to about 50 wt %; and
    an aqueous agent comprising water and an organic co-solvent, wherein the aqueous agent does not include the water-soluble crosslinker.

2. The three-dimensional printing kit of claim 1, wherein the polyhydroxylated swellable polymer is polyvinyl alcohol, and wherein the polyvinyl alcohol has a weight average molecular weight ranging from about 500 Mw to about 500,000 Mw.

3. The three-dimensional printing kit of claim 1, wherein the water-soluble crosslinker is reactive to form hydrogen bonds with the hydroxyl groups of the polyhydroxylated swellable polymer.

4. The three-dimensional printing kit of claim 1, wherein the aqueous agent consists of water, the organic co-solvent, and optionally a surfactant.

5. The three-dimensional printing kit of claim 1, wherein the particulate build material consists of the powdered polyhydroxylated swellable polymer and the powdered water-soluble crosslinker, and wherein the water-soluble crosslinker is present in the particulate build material in an amount ranging from about 10 wt % to about 30 wt %.

6. The three-dimensional printing kit of claim 5, wherein the powdered polyhydroxylated swellable polymer is polyvinyl alcohol powder and the powdered water-soluble crosslinker is sodium tetraborate powder.

7. The three-dimensional printing kit of claim 1, wherein the water-soluble crosslinker is selected from the group consisting of sodium tetraborate, boric acid, and a combination thereof.

8. The three-dimensional printing kit of claim 1, wherein the polyhydroxylated swellable polymer is polyvinyl alcohol, and wherein the polyvinyl alcohol has a weight average molecular weight ranging from about 20,000 Mw to about 200,000 Mw.

9. A hydrogel-three-dimensional printing system, comprising:
    the three-dimensional printing kit of claim 1; and
    a fluid applicator fluidly coupled or coupleable to the aqueous agent, wherein the fluid applicator is directable to iteratively apply the aqueous agent to layers of the particulate build material.

10. A method of three-dimensional printing, the method comprising:
    iteratively applying individual layers of a particulate build material to a powder bed, wherein the particulate build material comprises from about 90 wt % to 100 wt % of a mixture of a powdered polyhydroxylated swellable polymer dry blended with powdered water-soluble crosslinker that is reactive with hydroxyl groups of the polyhydroxylated swellable polymer to crosslink the polyhydroxylated swellable polymer, wherein:
        the polyhydroxylated swellable polymer is selected from the group consisting of polyvinyl alcohol, cellulose, gelatin, chitosan, hyaluronic acid, poly(2-hydroxyethyl acrylate), poly(2-hydroxyethyl methacrylate), poly(acrylic acid), poly(methacrylic acid), poly(N,N-dimethylacrylamide), poly(N,N-diethylacrylamide), poly(N-isopropylacrylamide), and a combination thereof;
        the water-soluble crosslinker is selected from the group consisting of sodium tetraborate, boric acid, cationic barium, and a combination thereof; and
        the water-soluble crosslinker is present in the particulate build material in an amount ranging from about 1 wt % to about 50 wt %; and
    based on a three-dimensional object model, iteratively and selectively applying an aqueous agent onto the individual layers, wherein the aqueous agent comprises water and an organic co-solvent and does not include the water-soluble crosslinker, thereby forming a three-dimensional printed hydrogel.

11. The method of claim 10, wherein the particulate build material is maintained at a temperature ranging from about 0° C. to about 75° C.

12. The method of claim 10, wherein the aqueous agent is applied onto the individual layers at an agent density so that the individual layers include from about 50 wt % to about 95 wt % of the water based on a total weight of individual layer and aqueous agent applied.

13. A three-dimensional printing kit, comprising:
    a build material powder consisting of:
        a polyvinyl alcohol powder; and
        from about 20 wt % to about 30 wt % of a powdered, water-soluble crosslinker dry blended with the polyvinyl alcohol powder, wherein the powdered, water-soluble crosslinker is reactive with hydroxyl groups of the polyvinyl alcohol powder and is selected from the group consisting of sodium tetraborate, boric acid, cationic barium, and a combination thereof; and an aqueous agent comprising water and an organic co-solvent.

\* \* \* \* \*